United States Patent [19]

Roach

[11] Patent Number: 4,558,990
[45] Date of Patent: Dec. 17, 1985

[54] COMPOSITE PUMPING SYSTEM

[75] Inventor: Stewart W. Roach, Seattle, Wash.

[73] Assignee: Marco Seattle, Inc., Seattle, Wash.

[21] Appl. No.: 149,139

[22] Filed: May 12, 1980

[51] Int. Cl.[4] .............................................. F04F 5/22
[52] U.S. Cl. .................................... 417/54; 43/4.5;
43/6.5; 417/87; 417/90
[58] Field of Search .................. 43/6.5, 4.5; 417/87,
417/90, 179, 197, 54

[56] References Cited

U.S. PATENT DOCUMENTS

| 646,640 | 4/1900 | Evans | 417/87 |
|---|---|---|---|
| 1,388,414 | 8/1921 | Dros | 43/6.5 |
| 1,415,113 | 5/1922 | Phillips | 43/6.5 |
| 2,148,131 | 2/1939 | Parker | 417/87 X |
| 2,571,932 | 10/1951 | Olsson | 417/87 |
| 2,736,121 | 2/1956 | Kimmerle | 43/6.5 |
| 3,010,232 | 11/1961 | Skakel et al. | 417/87 X |
| 3,069,797 | 12/1962 | Kreutzer | 43/4.5 |
| 3,175,515 | 3/1965 | Cheely | 417/197 |
| 3,314,184 | 4/1967 | Lerch | 43/4.5 |
| 3,393,519 | 7/1968 | Mitchell | 417/179 X |
| 3,421,245 | 1/1969 | Lerch | 43/6.5 |
| 3,448,691 | 6/1969 | Frazier | 417/197 X |
| 4,028,009 | 6/1977 | Gudzenko et al. | 417/179 X |
| 4,155,682 | 5/1979 | Hillis | 417/169 |
| 4,193,737 | 3/1980 | Lemmon | 43/6.5 |

FOREIGN PATENT DOCUMENTS

| 842282 | 6/1952 | Fed. Rep. of Germany | 43/6.5 |
| 117668 | 8/1969 | Norway | 43/6.5 |

Primary Examiner—Edward K. Look
Attorney, Agent, or Firm—Christensen, O'Connor Johnson & Kindness

[57] ABSTRACT

An article transfer pumping system combining the effects of a jet pump and an air lift pump to minimize article damage while increasing lift capability and overall system efficiency. Air lift pump placement adjacent the pump inlet aerates the rising column of water with articles such as fish, even large salmon, being raised by the jet pump, whereas jet pump placement adjacent the discharge end of the conduit increases pump efficiency.

15 Claims, 2 Drawing Figures

COMPOSITE PUMPING SYSTEM

BACKGROUND OF THE INVENTION

This invention relates to systems for pumping waterborne solid articles such as fish, marine crustacea and others, and is herein illustratively described by reference to the presently preferred form thereof as applied to pumping fish. It will be recognized, however, that certain modifications and changes with respect to details may be made, and that the invention may be used in other applications without departing from the essential features involved.

Fish and other food articles have been pumped with water through conduits by a variety of techniques. One in use employs a submersible on-line centrifugal pump through which the articles must pass. Such pumps are in commercial use to brail herring and other small fish from fishing nets, to transfer fish from the flooded holds of fishing vessels to receiving tanks in processing plants, and in similar applications. However, attempts to use such pumps of practical size for larger fish or more delicate forms of marine life can present problems due to flesh damage.

In air lift pumping, air under pressure is injected into the vertical run of a water primed siphoning conduit so as to lift the water and articles borne by the water through the conduit. These pumps, requiring no moving parts within the transfer path, have a gentle action. However, their pumping height capability is too limited for many applications. Attempts to achieve increased lift by lowering the inlet end of the conduit further below the water's surface is limited by physical constraints in most cases.

Water jet pumps are also in use. These pumps can move a column of water carrying solid articles to considerable heights and, like air lift pumps, operate without necessity of the articles passing through a mechanical impeller. However, article damage is nevertheless a problem with water jet pumps if attempting to achieve the lift height required for many applications because of the high degree of turbulence and the high pressure gradients within the jet injection chamber of the conduit causing flesh damage and disintegration of more delicate marine life such as shrimps and crabs.

The present invention is directed to providing an improved pumping system for such applications and, more particularly, a pumping system that effectively utilizes the lift capability of a water jet pump and, in fact, increases that capability while greatly reducing the article damage experienced in water jet pumps operated at comparable jet velocity.

A further object hereof is to devise an improved pumping system achieving the described results at relatively low cost and without unduly bulky apparatus requirements. A related object is to provide such a system which is relatively easy to install, relatively light in weight and uses components that can be made stowable and readily moved about for assembly and disassembly aboard fishing vessels, and in similar applications.

A further object hereof is to improve the efficiency of jet pumps, particularly jet pumps when used for pumping liquid-borne solid articles. It is a further object to minimize wall abrasion damage of solid articles being pumped.

SUMMARY OF THE INVENTION

In accordance with this invention as herein disclosed, the described objectives are attained by combining the effects of an air lift pump with a water jet pump mounted in the transfer conduit above the air lift pump and preferably as closely adjacent the discharge end of the transfer conduit as is practical. Aeration of the water produced by the air pump is found not only to materially increase the lifting capacity of the jet pump by reducing the average density of the column of water being raised by the jet pump, but it also serves to reduce article damage from wall abrasion and impact effect of the high-velocity water jets. Comparable results even approaching these have not been possible with either pumping system acting alone or with any other system of which applicant is aware.

At the same time, the system lends itself to further increasing the pumping height by submergence of the air ring or nozzle in the body of liquid being pumped upwardly, the depth of submergence adding proportionately and directly to the lift capability of the system. Moreover, the system is self-priming and, thus, inherently adaptable to either intermittent or continuous service.

With the improved pump system of this invention the air lift pump, aiding the jet pump both as a booster and in its otherwise unique role as an aerator, provides the effect of additional depth of submergence of the transfer conduit inlet, giving the pump system capability of pumping to increased heights above liquid surface level within given depth of submergence limitations of the installation. Despite the added energy requirements imposed to drive the air lift pump compressor, overall efficiency is maintained—even increased—by the reduction of liquid/article friction in the transfer conduit. This is especially so if the jet pump is positioned in the conduit at or near the highest point in the upward run of conduit such that liquid friction losses in the conduit are minimized where flow velocity is highest, with the air pump nozzle array located at or near the inlet. Under these conditions, article damage is kept at a minimum. In fact, with the novel system it has proven possible to elevate salmon as large as 25 pounds 15 feet or more without appreciable bruising or flesh damage, whereas smaller fish and other forms of marine life can readily be lifted to appreciably higher levels with little or no damage, feats not possible in such measure with conventional pumps.

In the preferred mode and embodiment of the invention the air lift pump nozzle array is positioned with little or no submergence. It should be recognized, however, that it can be submerged and that it will be submerged to increasing depths if and as the transfer conduit upon which it is mounted is submerged to achieve increased pumping height when the confinement limitations of the body of liquid/articles to be pumped permits it and the installation requires it. Further, the jet pump is designed without a diffuser, an advance permitted by the aerated condition of the liquid being pumped. Eliminating the usual diffuser avoids a change of cross-sectional area in the transfer path of liquid being pumped. This, together with use of reduced jet pump pressures selected to achieve correctly designed cross-sectional area ratio of jet nozzles and main channel, further reduces impact damage of the fish or other articles being pumped.

In operation, water with entrained solids or articles is drawn from an open container or enclosure, such as a fishing net, through an inlet and pumped to an elevated dischage point where it is discharged into a suitable receiver. The system is operable in a steady continuous manner or at intervals if desired. It is well suited to convenient intermittent or periodic operation because of the simplicity of the priming procedure, which is achieved by turning on the jet pump to fill the conduit and thereupon creating upward lift pressures therein, whereupon the air lift pump is activated to initiate immediate full-scale operation. All of this is accomplished very quickly without need for separate or complex equipment or procedures.

Moreover, the compact portablilty of the system, which is lent to unitized construction, like conventional jet pumps or air lift pumps, offers advantages. It can be hoisted and supported by a mast and boom on a vessel or dock and can be raised and lowered by cables, sheaves and winch apparatus so as to operate from a ship's hold flooded for the purpose or from the confines of a fishing net over the side. If desired, submersion depth adjustments, or conduit length variations needed to maintain submergence when surface level drops relatively, may be effected by any of different means including forming the transfer conduit extending between the jet pump and air lift pump from mutually telescoping sections.

These and other features, objects and advantages of the invention will become more fully evident from the description that follows by reference to the accompanying drawings.

DETAILED DESCRIPTION

Figure 1:
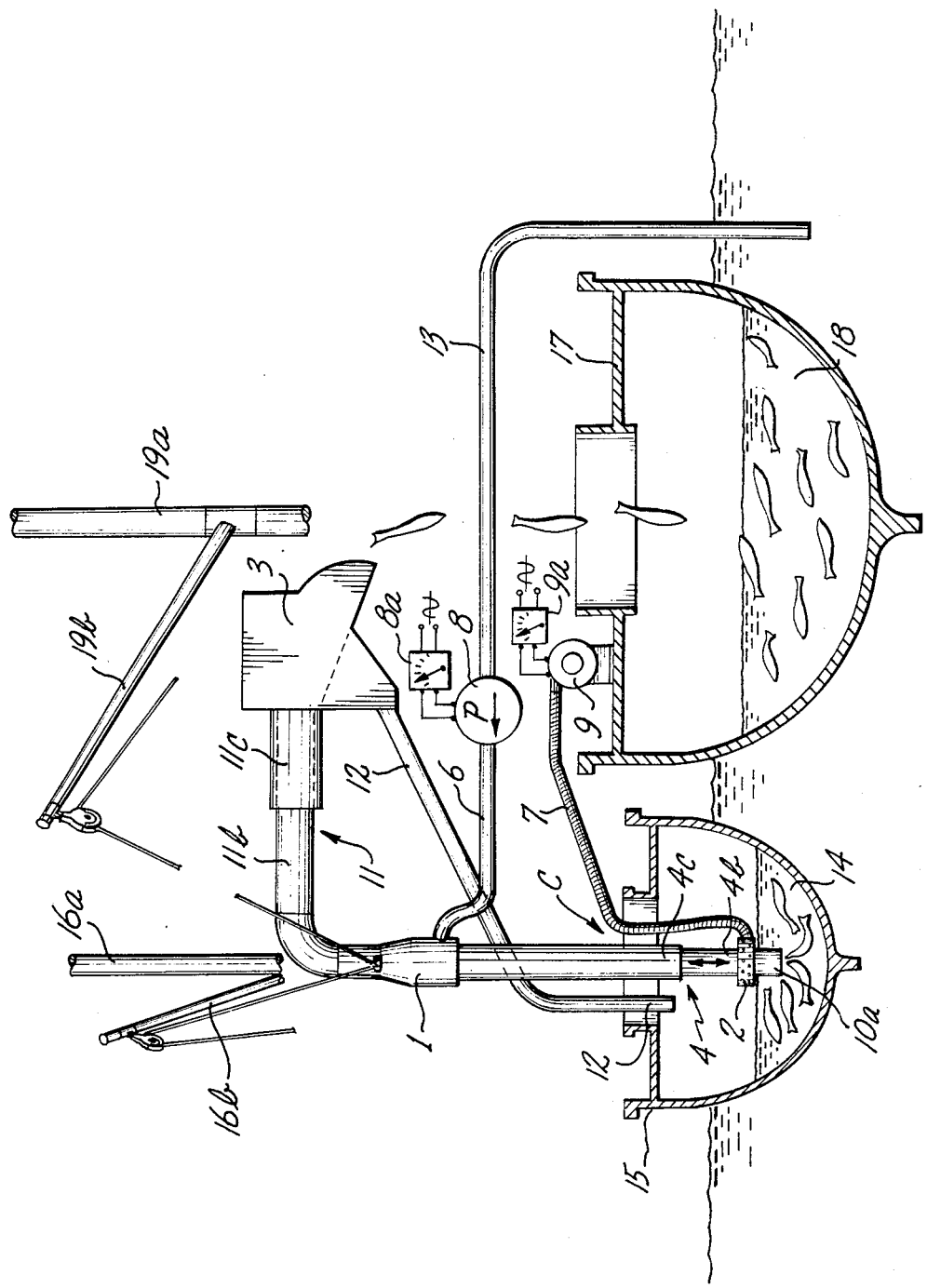
FIG. 1 is a simplified vertical sectional view of a fish transfer installation depicting a system of the invention being used to transfer fish from the flooded hold of a fishing vessel to that of a larger buyer's vessel.

As depicted, the system is shown set up to pump fish such as herring, salmon or other types from the flooded hold 14 of fishing vessel 15 to the hold 18 of a larger fish buyer's vessel 17. The specifics of controls and mounts are or may be a matter of choice or engineering to suit each of the requirements of each installation. The transfer conduit C leads upwardly from hold 14 to a dewatering chute 3 that directs the fish into hold 18 while returning the gurry-rich water back into hold 14 through pipe 12 where it aids in the foaming action within conduit C as described. Jet pump 1, which may draw water from over the side of the vessel or from hold 14, is operatively mounted between the discharge section 11 of transfer conduit C and the inlet section 4 of conduit C. Discharge section 11 includes mutually telescoping tubes 11b and 11c interengaged in slidable relationship to permit varying the lateral reach or length of the transfer conduit between dewatering chute 3 and the upwardly directed portion of conduit C. The inlet section 4 of conduit C includes two mutually telescoping tubes 4b and 4c sealed in slidable relationship to permit varying the depth of immersion or the vertical drop of inlet 4 to reach the contents of ship's hold 14. Air lift pump 2 comprising a circular array of air discharge nozzles is mounted near the lower or inlet end of tube 4b to inject streams of air bubbles into the conduit from a plurality of circumferentially spaced points around its periphery. Nozzle 2, as thus mounted in and upon tube 4b, is adapted to be lowered to varying depths of submersion into whatever body of liquid is being pumped upwardly in conduit C.

Air lift pump 2 is supplied with air under pressure from an air compressor 9 through flexible low pressure hose 7. Jet pump 1 is supplied through pipe or hose 6 with water under pressure from pump 8. The latter preferably comprises a centrifugal water pump drawing water through hose 13, and may be operated at any of different output pressures under control of a suitable pump speed regualtor 8a. If desired, air volume from compressor 9 may also be varied by means schematically depicted as a drive speed controller 9a.

The entire assembly, conveniently manufactured as a compact and portably usable unitized system with parts that may easily be assembled for use and disassembled for shipment and stowage, may be suspended by lines from suitable supports, such as the mast 19a and boom 19b of vessel 17 with steadying and guying from mast 16a and boom 16b as well as other points of guy line securement on vessel 15.

Figure 2:
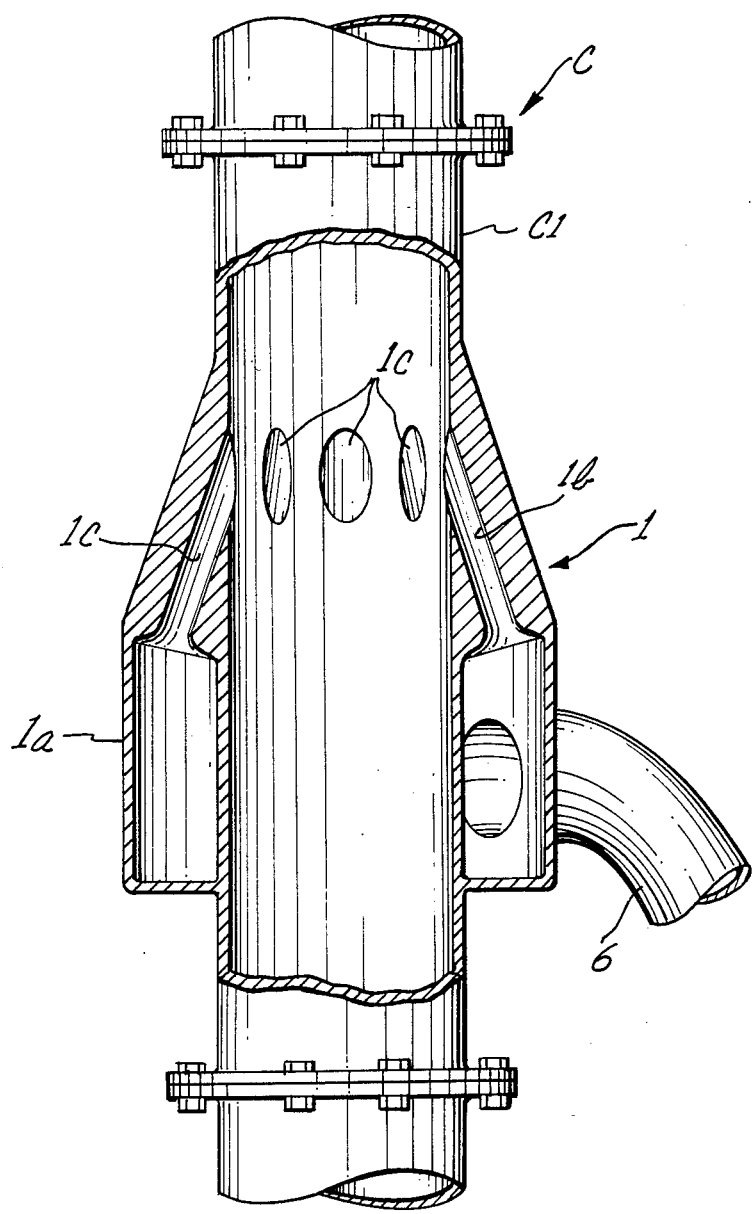
FIG. 2 is an enlarged sectional side elevation of the preferred jet pump shroud and nozzle unit embodied in a section of the transfer conduit.

Jet pump 1 shown in FIG. 2 is embodied in a conduit section C1 flanged and bolted serially in the conduit C. Its internal diameter matches that of the main conduit. It is surrounded by a jacketing shroud or annular plenum 1a. The plenum has a circumferentially spaced series of upwardly directed passages 1b that terminate in orifice openings 1c in the interior wall of conduit section C1, which orifices thereby produce a circumferentially distributed series of upwardly directed jets of liquid such as seawater under pressure delivered to plenum 1a by pump 8. The jet discharge directions are angled, such as at about 15°, to the conduit axis. The area ratio of the jet orifices and the interior of conduit C is determined so as to provide efficient pumping to desired heights having regard to the objective of avoiding article damage through maximizing jet flow volume at minimum jet flow velocity. As previously explained, the aerated condition of the column of water with articles being induced to flow upwardly in conduit C is created by the aeration effect of air lift pump 2. The system operates effectively in saltwater and in freshwater. When pumping fish and other marine creatures, attendant blood, slime and other protein materials tend to act as foaming agents. While foaming can prove troublesome if excessive, a normal concentration of such foaming materials in the water being pumped is acceptable and may even prove to be of aid in the avoidance of article damage.

In typical installations, depending upon types and sizes of articles to be pumped and upon pumping height and rate requirements, the conduit C may have an internal diameter in the range, for example, from 4" to 20", and may be designed in its upwardly extending length or reach dimensions to pump as high as 20 feet or more.

When pump 8 is primed and operating, conduit C fills with water, eliminating the air. Water then induced to flow upwardly in conduit C under pressure from pump 8 and aided by atmospheric pressure sucks water upwardly from hold 14 to the discharge chute 3. The air compressor 9 is then placed in operation, forcing air into the air orifice assembly 2. The air injection thereupon increases the flow rate to a significantly higher value, such that fish in hold 14 become entrained in the flow entering the inlet end of the conduit C. Upon reaching jet pump 1, additional energy imparted by the jets to the upwardly flowing mixture occurs, yet it does so without material damage or bruising of the fish. The aerated lightness of the columnar flow has a cushioning or insulating effect preventing this and also preventing abrasion damage of the fish from rubbing on the conduit walls. The air bubbles which make up nearly half the flow under an efficient operating balance in the system, act to cushion the fish.

If desired, a foot valve 10a may be mounted in the lower inlet end of conduit section 4b to close and hold water in the conduit when the pumps are shut down. This expedites priming and restarting of the system after a period of idleness.

If added pumping height is needed above that being produced under an existing set of operating conditions, or it is desired to reduce jet water flow pressure and volume, the inlet end of conduit C may be more deeply submerged in the mixture being pumped. With every foot of increased depth one added foot of above-surface pumping height is achieved.

With an 8" conduit, the average fish transfer rate achieved for essentially "dry" herring was 35 to 40 tons per hour at water shroud pressures ranging from 40 psi to 57 psi at a maximum lift height of 12 feet. Air was added at a rate to reduce aerated water column average density approximately in half. With a 10" conduit, the average transfer rate of "dry" herring was up to 100 tons per hour under similar conditions. Similarly, salmon up to 25 pounds were pumped out of fish holds to a height of 15 feet and live salmon were pumped from seine nets without damage to an equivalent height at the rate of 13,000 fish in one and a quarter hours at 20 psi water jet shroud pressure.

In practical designs, with an 8 inch conduit (internal area of 0.3474 square feet), water jet nozzle internal area (with 8 nozzles) totalled 0.0336 square feet, for an area ratio fo 0.097. For a 10 inch conduit the corresponding values proving best were 0.5456, 0.0557 and 0.10, respectively. With a 20 inch conduit, not yet tested, these values are calculated to be 2.183, 0.2176 (16 nozzles) and 0.10, respectively. Companion to those water jet area and area ratio values for the 8 inch, 10 inch and 20 inch conduits are the following air shroud design and operating values:

| Conduit | Air Hole Diameter | No. of Holes | Air Flow Range |
| --- | --- | --- | --- |
| 8 inch | 0.25 inch | 30 | Up to 120 CFM at 2PSG |
| 10 inch | 0.25 inch | 66 | Up to 150 CFM at 2PSG |
| 20 inch | 0.25 inch | 110 | Up to 500 CFM at 2PSG |

Those values apply to the transfer mode, i.e., pumping from one fish holding tank to another. When pumping from an open net with greater submergence of the intake, more air flow was supplied to achieve equivalent results with lower jet water pressure and flow.

These and other aspects of the invention will be evident to those skilled in the field of pumping systems, particularly as applied to fish transfer applications, who will thereby appreciate the illustrative and not necessarily delimitative purpose of the foregoing disclosure of the presently preferred embodiment and application of the invention.

The embodiments of the invention in which an exclusive property or privilege is claimed are defined as follows:

1. In an article transfer system wherein liquid-borne articles are pumped from a first elevation to a higher second elevation, the combination comprising conduit means defining an upwardly directed flow path for liquid-borne articles to be pumped, air injection nozzle means operatively mounted in relation to said conduit means, means to supply pressurized air to said air nozzle means at a rate that materially reduces the average density of the column of contents in said conduit means above said air nozzle means, said conduit means having an inlet at or below said air nozzle means for ingestion of liquid-borne articles to be pumped, jet pump nozzle means operatively mounted in relation to said conduit means at a relative elevation above said air nozzle means, and means to supply pressurized liquid to said jet pump nozzle means for pumping said column of contents through said conduit means.

2. The system combination defined in claim 1, and means to vary the depth of submergence of the conduit means inlet in a body of liquid carrying articles to be pumped.

3. The system combination defined in claims 1 or 2, wherein the air nozzle means is mounted substantially adjacent said inlet and is adapted to be submerged in the body of liquid, thereby to increase the lifting capability of the system.

4. A marine creature pumping system comprising conduit means having an inlet submersible in water carrying such creatures and defining a flow path for such creatures directed upwardly from said inlet, air lift pump means mounted in operative association with said conduit means substantially adjacent the lower end of said flow path, jet pump means mounted in operative association with said conduit means at a relative elevation above said air lift pump means and operable therein cooperably with said air lift pump means to pump upwardly in said conduit means a column of water carrying such creatures and aerated by said air lift pump means.

5. The system combination defined in claim 1, wherein the conduit means extends substantially to the first elevation and the jet pump nozzle means is located therein substantially adjacent said first elevation.

6. The system combination defined in claims 4 or 5, wherein the inlet means is adapted to be submerged in the body of water to any of varying depths, thereby to vary the lift capability of the system.

7. The method of pumping liquid-borne articles from a first elevation to a higher second elevation utilizing a water jet pump to induce upwardly directed flow in a conduit-defined flow path, said method comprising aerating the water in said flow path as it moves upwardly from said first elevation at a location below said water jet pump to reduce the density of the water being pumped.

8. The method of pumping fish and other marine creatures from a first elevation to a higher second elevation utilizing a water jet pump to induce upwardly directed flow in a conduit-defined flow path, said method comprising aerating the water in said flow path as it moves upwardly from said first elevation at a location below said water jet pump to reduce the density and produce foaming in the water being pumped.

9. The method defined in claim 8, wherein the water with marine creatures is pumped from the confines of a fishing net to effect brailing the net of its catch.

10. The method defined in claim 8, wherein the water with marine creatures is pumped from the confines of a holding tank and is separated from the marine creatures and returned to the holding tank in a continuous circuit.

11. A liquid pumping system comprising conduit means defining an upwardly directed flow path having an inlet submersible in a body of such liquid, a source of pressurized air, air lift pump nozzle means operatively connected to said air pressure source and mounted in said conduit means adjacent the lower end of said flow path for aerating and drawing liquid upwardly into said flow path, a source of pressurized liquid, and jet pump nozzle means operatively connected to said liquid pressure source and mounted in said conduit means at a relative elevation above said air lift pump nozzle means for pumping liquid upwardly in said flow path.

12. The method of pumping liquid to an increased elevation through conduit means defining an upright path from an inlet below the surface of such liquid comprising jetting liquid upwardly into said path at a first location and jetting air into said path below said first location to produce a highly aerated condition in the conduit means.

13. The method defined in claim 12, wherein the liquid first mentioned is seawater.

14. The method defined in claim 12, wherein the liquid first mentioned carries sea creatures to be pumped.

15. The method defined in any of claims 12–14, and the further steps of decreasing the volumetric flow of liquid jetted upwardly into the conduit while increasing the depth of submergence of the inlet.

* * * * *